United States Patent
Gauger

(10) Patent No.: US 9,778,715 B2
(45) Date of Patent: Oct. 3, 2017

(54) MASTER-SLAVE COMMUNICATION SYSTEM INCLUDING A STANDBY OPERATION IN WHICH A STANDBY VOLTAGE IS PROVIDED THAT IS LOWER THAN A LOWER VOLTAGE THRESHOLD IN A NORMAL OPERATING MODE

(71) Applicant: Robert Bosch GmbH, Stuttgart (DE)

(72) Inventor: Maximilian Gauger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 90 days.

(21) Appl. No.: 14/569,949

(22) Filed: Dec. 15, 2014

(65) Prior Publication Data

US 2015/0169022 A1   Jun. 18, 2015

(30) Foreign Application Priority Data

Dec. 13, 2013   (DE) .................. 10 2013 225 882

(51) Int. Cl.
  *G06F 9/00* (2006.01)
  *G06F 1/26* (2006.01)
  (Continued)

(52) U.S. Cl.
  CPC ............ *G06F 1/266* (2013.01); *G06F 1/3203* (2013.01); *G06F 1/325* (2013.01); *G06F 1/3296* (2013.01);
  (Continued)

(58) Field of Classification Search
  CPC ....... G06F 1/3296; G06F 1/266; G06F 1/3203
  (Continued)

(56) References Cited

U.S. PATENT DOCUMENTS

2005/0223244 A1* 10/2005 Sinai .................. G06F 1/32
                                                     713/300
2010/0162256 A1*  6/2010 Branover ............ G06F 1/3203
                                                     718/104
(Continued)

FOREIGN PATENT DOCUMENTS

DE     102012205160      10/2013
WO   WO 2012027584 A1 *  3/2012    .......... G06F 1/3203

OTHER PUBLICATIONS

Peripheral Sensor Interface for Automotive Application, Aug. 10, 2012, V2.1, p. I-p. 59.*

*Primary Examiner* — Aurel Prifti
(74) *Attorney, Agent, or Firm* — Norton Rose Fulbright US LLP; Gerard Messina

(57) ABSTRACT

The application describes a master/slave communication system, in particular a PSI5 communication system, including at least one slave participant, at least one master participant, and a communication connection between the slave participant and the master participant. In this case, the slave participant is supplied by the master participant with a supply voltage between a lower voltage threshold and an upper voltage threshold via the communication connection in a normal operating mode. The master/slave communication system has, in addition to the normal operating mode, a standby operating mode at its disposal in which the master participant supplies the slave participant with a standby voltage below the lower voltage threshold via the communication connection.

18 Claims, 2 Drawing Sheets

(51) Int. Cl.
*G06F 1/32* (2006.01)
*H04Q 9/00* (2006.01)
*H04L 12/403* (2006.01)
*G06F 13/40* (2006.01)

(52) U.S. Cl.
CPC ........ *G06F 13/4063* (2013.01); *H04L 12/403* (2013.01); *H04Q 9/00* (2013.01); *H04Q 2209/883* (2013.01); *Y02B 60/1285* (2013.01)

(58) Field of Classification Search
USPC .......... 718/104; 713/300; 709/208; 323/311; 315/291
See application file for complete search history.

(56) References Cited

U.S. PATENT DOCUMENTS

| | | | | |
|---|---|---|---|---|
| 2010/0327840 | A1* | 12/2010 | Rasaratnam | ............ H02M 3/02 |
| | | | | 323/311 |
| 2011/0080110 | A1* | 4/2011 | Nuhfer | ............... H05B 33/0815 |
| | | | | 315/291 |
| 2011/0273806 | A1* | 11/2011 | Roehm | ..................... B25F 5/00 |
| | | | | 361/93.8 |
| 2012/0275198 | A1* | 11/2012 | Cohen | ............... H02M 3/33507 |
| | | | | 363/21.12 |
| 2013/0099888 | A1* | 4/2013 | Redaelli | ................. H01H 85/11 |
| | | | | 337/290 |
| 2013/0262610 | A1* | 10/2013 | Rohatschek | ............ H04L 49/15 |
| | | | | 709/208 |

* cited by examiner

MASTER-SLAVE COMMUNICATION SYSTEM INCLUDING A STANDBY OPERATION IN WHICH A STANDBY VOLTAGE IS PROVIDED THAT IS LOWER THAN A LOWER VOLTAGE THRESHOLD IN A NORMAL OPERATING MODE

FIELD OF THE INVENTION

The present invention relates to the communication between slave participants and a master participant in a communication system. In particular, the present invention may be used in a PSI5 communication system for a master control device and sensors as the slave participants. The PSI5 communication system is, in particular, used in the automotive field.

BACKGROUND INFORMATION

The PSI5 bus (see "PSI5 V2.1, Technical Specification, Peripheral Sensor Interface for Automotive Applications, 8 Oct. 2012") is a two-wire bus which ensures the voltage supply of slave participants and the communication on the same line pair.

In the idle mode, a master participant supplies the bus with a supply voltage, typically in the range between 4.4 V and 11 V. The master communicates with the slaves via sync pulses which are short voltage pulses on the line pair. A slave communicates with the master via a current interface: For transmission, the slave temporarily applies a current which is detected by the master with the aid of an installed current sink. Due to a relatively high signal current of 26 mA and the bit coding in the Manchester Code, a high interference protection is achieved, whereby the use of a cost-effective, twisted two-wire line is sufficient for wiring. The data words include two start bits each, 8 to 24 data bits, and a parity bit or 3-bit CRC (cyclic redundancy check).

The PSI5 bus is used in motor vehicles for the communication between a control device (master) and one or multiple sensors (slaves). Point-to-point and bus configurations including asynchronous and synchronous communication are supported. In previous applications, the bus is either completely active or completely deactivated by turning off the voltage.

For some new applications, it may be meaningful, however, to transfer the bus into a standby state in which communication does not take place, but individual or all slaves are still active at a reduced power consumption and may restart the bus communication if a certain event occurs.

A master/slave communication system is also provided in German Published Patent Application No. 102012205160. Here, individual participants may be transferred into a standby mode or into a sleep mode with the aid of a message.

SUMMARY

The method according to the present invention is directed to a master/slave communication system which includes a standby operating mode. In this case, standby operating mode is to be understood to mean an operating mode of the communication system in which its participants operate in a power- or, if necessary, function-reduced state, but are not necessarily completely deactivated. The advantage of such a standby operating mode is a reduced power consumption by the communication system.

In a master/slave communication system, in particular a PSI5 communication system, including at least one slave participant, at least one master participant, and a communication connection between the slave participant and the master participant, it is assumed in this case that in a normal operating mode, the slave participant is supplied by the master participant with a supply voltage between a lower voltage threshold and an upper voltage threshold via the communication connection. The normal operating mode is, in this case, an operating mode in which the participants of the communication system operate fully and are not in a state of reduced power consumption.

In order to enable such a reduced power consumption and thus an energy-saving mode, the master/slave communication system has a standby operating mode in addition to the normal operating mode. This standby operation is advantageously initiated in that the master participant supplies the slave participant with a standby voltage below the lower voltage threshold via the communication connection. The lower voltage threshold is, in this case, the lower limit of the voltage supply by the master which is provided for the normal operation in the communication system.

One advantage resulting therefrom is the flexible implementation of a standby mode which may also be carried out in communication systems in which not all participants are already set up for a standby operating mode. The slave participants of such an operating system which are already set up for a standby operation (e.g., by hardware and/or software modifications) recognize the reduced supply voltage below the lower threshold of the supply during normal operation and change to standby operation at reduced power consumption. The slave participants which do not have the appropriate means yet are not designed for an operation below the supply threshold and will change to a deactivated state. This therefore makes a standby mode possible in which the slave participants, which are suitable for this, change to a standby mode and the slave participants which are not suitable for this at least do not interfere by communication attempts, since they are in a deactivated state.

In contrast to a deactivated state, the slave participants are supposed to continue detecting useful data not only in the normal operating mode, but also advantageously in the standby operating mode. This applies to sensor slaves, in particular, which continue detecting sensor data. In this way, it is ensured that a response to certain detected data is still possible in the standby mode. In order to also achieve a reduction of the power consumption in this case, the detection of useful data may take place during standby operation at reduced frequency in one embodiment.

The slave participant advantageously transmits useful data to the master participant in the normal operating mode according to internal rules (e.g., in regular intervals or in the case of internally established transmission need) or upon request by the master participant. In the automotive field, this may, in particular, apply to the transmission of sensor data from a sensor slave to an electronic master control device. The master control device receives in this case useful data, processes these, and may carry out regulations or controls in a vehicle on the basis of the processed useful data. In the standby operating mode, the slave participant transmits these useful data to the master participant at a reduced frequency as compared to the normal operating mode or, in the preferred variant, not at all. In this way, either a reduced power consumption with a useful data transmission which continues to be limited, but is carried out nevertheless, or, preferably, a strongly reduced power consumption with a completely discontinued useful data communication may be achieved.

During normal operation, the master participant usually transmits synchronization messages as voltage pulses to the slave participant(s) via the communication connection. This may, for example, signal a communication readiness or a reception readiness of the master participant. During the standby operation, these synchronization messages are preferably discontinued in order to reduce the power consumption in the communication system.

As described above, useful data also continue to be detected by the slave participants in the standby operating mode. If a slave participant determines according to internal rules based on the evaluation of these useful data that measures are to be taken, the slave participant should advantageously have the possibility of requesting a termination of the standby operating mode from the master participant. This may be necessary, for example, when the detected useful data assume values outside of a predetermined value range or when conspicuous changes in the values are established. Here, it is provided that in the standby operating mode, the slave participant may request from the master participant to terminate the standby operating mode by initiating a first current flow via the communication connection with the aid of a current sink. To make sure that this current flow is understood by the master participant as a request for the termination of the standby operation, a specific duration or a specific current intensity may be predetermined for the current flow.

For master/slave communication systems, in particular, for a PSI5 bus system, it was established in the automotive field that a voltage range for the normal operation having a lower threshold between 4 V and 9 V and an upper threshold between 10 V and 12 V, as well as a standby voltage between 2 V and 4 V, in particular between 3.3 V and 4 V, provides good results with regard to signal reliability, energy consumption, and compatibility for existing systems or for common electronic systems (such as sensors and electronic control devices). These voltage ranges are therefore provided as preferred exemplary embodiments.

In addition to the master/slave communication system, appropriate participants are also provided, the slave participant, in particular a sensor, having means at its disposal for being supplied with a voltage by a master participant of the master/slave communication system via a communication connection. In the case of a supply with a supply voltage between a lower voltage threshold and an upper voltage threshold, the slave participant operates in a normal operating mode and in the case of a supply with a standby voltage below the lower voltage threshold, the slave participant operates in a standby operating mode. For this purpose, the slave participant requires electronic means for being able to provide a functionality (even if reduced) for the normal operation also in the case of a voltage supply below the lower voltage threshold. Moreover, it has means at its disposal for detecting a voltage drop below the threshold and for subsequently changing to the standby mode.

The slave participant preferably has means for continuously detecting useful data in the standby operating mode completely or only at a reduced frequency compared to the normal operating mode as well as for transmitting in the standby operating mode, the useful data to the master participant only at a reduced frequency compared to the normal operating mode or, preferably, not at all. In this way, the reduced power consumption is ensured, while keeping at least some of the functionality at the same time.

In one preferred embodiment, the slave participant furthermore includes means for transmitting a request to the master participant for leaving the standby operation based on detected useful data, in particular when the value contained in the useful data leave a predetermined value range. This preferably takes place in that the slave participant initiates a current flow over a predetermined duration and/or with a predetermined current intensity via the communication connection.

A master participant for such a master/slave communication system, in particular a control device, has means at its disposal for supplying a slave participant of the master/slave communication system with a voltage via a communication connection. In this case, it has the means at its disposal for supplying the slave participant with a supply voltage between a lower voltage threshold and an upper voltage threshold in a normal operating mode and with a standby voltage below the lower voltage threshold in a standby operating mode.

The master participant is the one which initiates the standby operation by reducing the voltage below the lower threshold of the normal operation and terminates the standby operation by raising the voltage above the lower threshold of the normal operation. For this reason, the master participant should preferably also have means for establishing a request by a slave participant for the termination of the standby operation. In this case, means are involved, in particular, for detecting a current flow on the communication connection and for establishing its duration and/or current intensity, if necessary. Based on this information, the master control device recognizes such a request by the slave participant and is able to terminate the standby mode.

In order to keep the power consumption of the entire communication system low during the standby mode, the master participant does not apply voltage pulses to the communication connection, in particular no synchronization messages to the slave participant.

Furthermore, a method is provided for communicating in a master/slave communication system, as presented above, or between a slave participant, as presented above, and a master participant, as presented above.

In this case, the slave participant is supplied by the master participant via the communication connection with a supply voltage between a lower voltage threshold and an upper voltage threshold in a normal operating mode and with a standby voltage below the lower voltage threshold in a standby operating mode.

The master participant preferably carries out a change from the standby operating mode to the normal operating mode when it is presented with a corresponding request by the slave participant. In this case, the slave participant transmits the request to the master participant, in particular, by initiating a current flow over a predetermined duration and/or with a predetermined current intensity via the communication connection.

DETAILED DESCRIPTION

Figure 1:
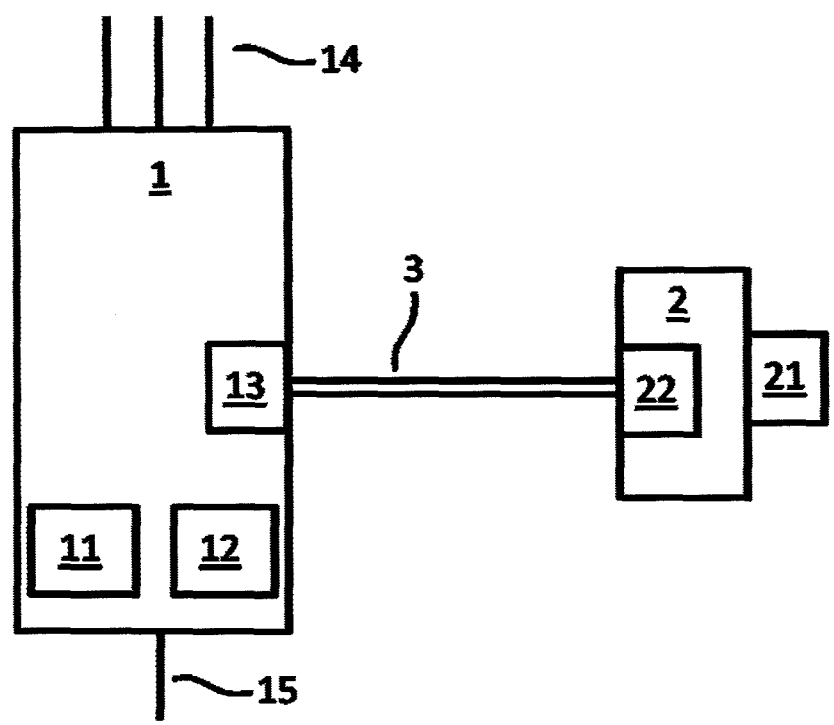
FIG. 1 schematically shows a master/slave communication system as an example.

FIG. 1 shows a master/slave communication system including a master participant 1 and a slave participant 2. In the following, the present invention is described for this constellation, but also for other constellations; the present invention is accordingly implementable in particular including multiple slave participants of the communication system.

Master participant 1, in particular an electronic control device in a vehicle, and slave participant 2, in particular a sensor in the vehicle, are connected via a communication connection 3. This communication connection is preferably designed as a two-wire connection, in particular as a PSI5 bus. Slave participant 2 and master participant 1 have corresponding communication interfaces 22 and 13, respectively, in particular PSI5 interfaces, at their disposal for connecting to the communication connection. Master participant 1 has memory means 11 and arithmetic means 12 at its disposal for processing useful data which it receives from slave participant 2. Slave participant 2 detects the useful data with the aid of a detection unit 21. Master participant 1 additionally preferably has other communication connections 14 as well as a voltage supply 15 at its disposal. Master participant 1 may carry out different controls or regulations on the basis of the received useful data.

Master participant 1 supplies slave participant 2 via communication connection 3 with a supply voltage between a lower and an upper voltage threshold in the normal operation and with a standby voltage below a lower voltage threshold in a standby operation.

Figure 2:
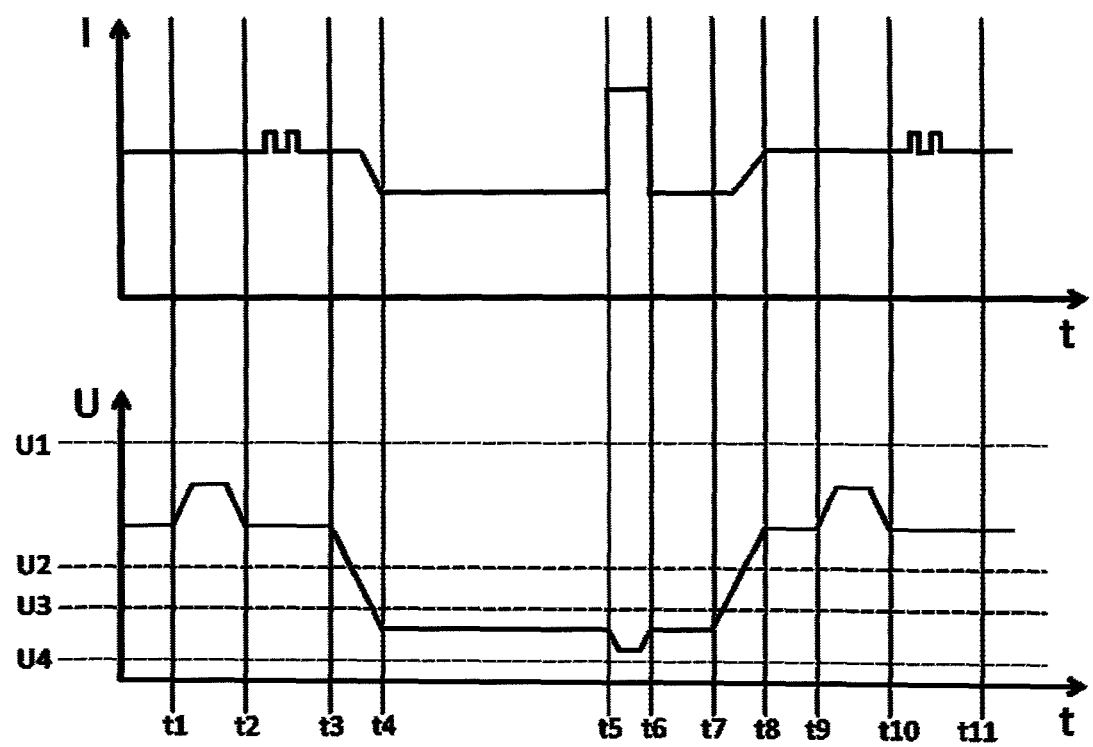
FIG. 2 schematically shows the current and voltage profiles, as an example, in an exemplary method for communication between a master participant and a slave participant.

In FIG. 2, a current profile (I) as well as a voltage profile (U) are illustrated above one another for identical time curve (t), as they may occur in a method for communication between a master participant and a slave participant of a communication system including a standby operating mode. Here, U1 identifies an upper and U2 a lower voltage threshold, between which the master participant supplies the slave participant with voltage in a normal operating mode via a communication connection between the two. In the standby operating mode, the voltage supply of the slave participant through the master participant takes place with a voltage below lower voltage threshold U2, here in a voltage range between U3 and U4.

Accordingly, the communication system is in a normal operating mode until point in time t3. In this operating mode, the master participant may, for example, display a reception readiness to the slave participant through a voltage or a synchronization pulse, as illustrated between t1 and t2. The slave participant may then transmit useful data to the master participant by generating current flows on the communication connection, as shown between t2 and t3. In t3, the master participant initiates the transition to standby mode by decreasing the voltage below threshold U2. In the present case, the decrease takes place until point in time t4 up to a voltage which is below U2 and between U3 and U4. This is to show the slave participant the transition of the communication system to the standby operating mode. Accordingly, the slave participant decreases its power consumption. The current on the communication line decreases.

In this standby operating mode, the slave participant continues to detect useful data. This is, however, not visible on the communication connection either through current or through voltage changes, since the slave participant does not transmit useful data to the master participant in this configuration. However, it is possible that the slave participant considers it necessary to terminate the standby mode as a result of the detected useful data. This may be the case, for example, when the detected data leave a predetermined value range or predetermined changes in the data occur.

Since the slave participant is not capable of terminating the standby mode itself, it must transmit a corresponding request to the master participant. This is illustrated here between t5 and t6. The slave participant initiates a current flow on the communication line, in particular through a current sink in the slave participant. This current flow may be detected by the master participant and interpreted as a corresponding request. In order to render the request unambiguous, the current flow may be established to have a predetermined intensity or a predetermined duration, for example. As a result of the current flow of the slave participant, the voltage on the communication connection also changes (which is not illustrated due to the small amplitude for the data transmission between t2 and t3).

Accordingly, the master participant initiates the transition from the standby operation to the normal operation between t7 and t8 by increasing the supply voltage above lower threshold U2 (but still below upper threshold U1). This is also recognized by the slave participant and it also changes back to the normal operating mode. Starting from t8, the communication system is thus back in the normal operating mode. Between t9 and t10, a voltage or synchronization pulse is displayed again by the master participant, and between t10 and t11, a useful data transmission is displayed again from the slave participant to the master participant.

The master participant may also terminate a standby operation automatically and is not limited hereto to the request or the waking by a slave participant. It must simply increase the voltage accordingly.

The voltage in the standby operating mode must continue to remain high enough so that the participating slaves may continue to be supplied in the standby mode via the communication line sufficiently to carry out their other functions. For a PSI5 bus having typical supply voltages between 4 V to 9 V and 10 V to 12 V in the normal mode, a supply voltage below 4 V, but above 2 V, in particular above 3.3 V, is provided, for example.

Slave participants which are designed for standby operation thus reduce their current consumption after the decrease in the supply voltage and discontinue the communication with the master participant as described above. However, they continue to monitor their useful data and check after a measurement whether a request to or waking of the master participant is necessary. The algorithm for this check is in this case specific to the individual application. Slave participants which are not designed for a standby operation will change to a deactivated state due to these low voltages and thus minimize their current consumption. The standby mode described above may thus also be used when slaves participate in the communication system which exist today and are not designed for standby operation.

What is claimed is:

1. A master-slave communication system, comprising:
    at least one slave participant;
    at least one master participant; and
    a communication connection between the slave participant and the master participant, wherein:
    in a normal operating mode, the slave participant being is supplied by the master participant with a supply voltage between a lower voltage threshold and an upper voltage threshold via the communication connection, and
    the master-slave communication system has, in addition to the normal operating mode, a standby operating mode in which the master participant supplies the slave participant with a standby voltage below the lower voltage threshold via the communication connection, wherein:
    the slave participant detects useful data in the normal operating mode, and the slave participant continues detecting the useful data in the standby operating mode, in response to the detected useful data exceeding a predetermined value range in the standby operating mode, the slave participant requests from the master participant to terminate the standby operating mode in that the slave participant initiates, via the communication connection with the aid of a current sink, a first current flow at least one of (1) over a predetermined duration and (2) with a predetermined current intensity.

2. The master-slave communication system as recited in claim 1, wherein the master-slave communication system is a PSI5 (Peripheral Sensor Interface) communication system.

3. The master-slave communication system as recited in claim 1, wherein the slave participant detects the useful data at a reduced frequency as compared to the normal operating mode.

4. The master-slave communication system as recited in claim 1, wherein:
the slave participant transmits the useful data to the master participant in the normal operating mode one of according to an internal rule and upon request from the master participant, and
the slave participant one of (1) transmits the useful data to the master participant in the standby operating mode at a reduced frequency as compared to the normal operating mode and (2) transmits the useful data not at all.

5. The master-slave communication system as recited in claim 1, wherein:
the master participant is an electronic control device,
the slave participant is a sensor, and
the useful data is sensor data ascertained by the sensor.

6. The master-slave communication system as recited in claim 1, wherein the master participant transmits a synchronization message to the slave participant in the normal operating mode, but not in the standby operating mode.

7. The master-slave communication system as recited in claim 6, wherein the master participant transmits a synchronization message through voltage pulses on the communication connection.

8. The master-slave communication system as recited in claim 1, wherein:
the lower voltage threshold is between 4 V and 9 V,
the upper voltage threshold is between 10 V and 12 V, and
the standby voltage is between 2 V and 4 V.

9. The master-slave communication system as recited in claim 8, wherein the standby voltage is between 3.3 V and 4 V.

10. A slave participant of a master-slave communication system, comprising:
an arrangement for being supplied with voltage by a master participant of the master-slave communication system via a communication connection; and
an arrangement for operating in a normal operating mode in the case of a supply with a supply voltage between a lower voltage threshold and an upper voltage threshold, and for operating in a standby operating mode in the case of a supply with a standby voltage below the lower voltage threshold, wherein:
the slave participant detects useful data in the normal operating mode, and the slave participant continues detecting the useful data in the standby operating mode,
in response to the detected useful data exceeding a predetermined value range in the standby operating mode, the slave participant requests from the master participant to terminate the standby operating mode in that the slave participant initiates, via the communication connection with the aid of a current sink, a first current flow at least one of (1) over a predetermined duration and (2) with a predetermined current intensity.

11. The slave participant as recited in claim 10, wherein the slave participant is a sensor.

12. The slave participant as recited in claim 10, further comprising an arrangement for detecting useful data in the standby operating mode only at a reduced frequency as compared to the normal operating mode.

13. The slave participant as recited in claim 10, further comprising an arrangement for transmitting useful data to the master participant in the standby operating mode only at a reduced frequency as compared to the normal operating mode or not at all.

14. A master participant of a master-slave communication system, comprising:
an arrangement for supplying a slave participant of the master-slave communication system with a voltage via a communication connection; and
an arrangement for supplying the slave participant with a supply voltage between a lower voltage threshold and an upper voltage threshold in a normal operating mode and with a standby voltage below the lower voltage threshold in a standby operating mode, wherein:
the slave participant detects useful data in the normal operating mode, and the slave participant continues detecting the useful data in the standby operating mode, and
in response to the detected useful data exceeding a predetermined value range in the standby operating mode, the slave participant requests from the master participant to terminate the standby operating mode in that the slave participant initiates, via the communication connection with the aid of a current sink, a first current flow at least one of (1) over a predetermined duration and (2) with a predetermined current intensity.

15. The master participant as recited in claim 14, wherein the master participant is a control device.

16. The master participant as recited in claim 14, wherein, subsequent to terminating the standby mode, the arrangement for changes to the normal operating mode.

17. The master participant as recited in claim 14, further comprising:
an arrangement for one of not causing a voltage pulse on the communication connection and for not transmitting a synchronization message to the slave participant during the standby operating mode.

18. A method for communication between a slave participant and a master participant of a master-slave communication system via a communication connection, comprising:
supplying the slave participant by the master participant with a supply voltage between a lower voltage threshold and an upper voltage threshold via the communication connection in a normal operating mode; and
supplying the slave participant with a standby voltage below the lower voltage threshold in a standby operating mode, wherein:
the slave participant detects useful data in the normal operating mode, and the slave participant continues detecting the useful data in the standby operating mode, and
in response to the detected useful data exceeding a predetermined value range in the standby operating mode, the slave participant requests from the master participant to terminate the standby operating mode in that the slave participant initiates, via the communication connection with the aid of a current sink, a first current flow at least one of (1) over a predetermined duration and (2) with a predetermined current intensity.

\* \* \* \* \*